(12) United States Patent
Lin

(10) Patent No.: US 9,570,975 B2
(45) Date of Patent: Feb. 14, 2017

(54) METHOD AND APPARATUS FOR CHARGE LEAKAGE COMPENSATION FOR CHARGE PUMP WITH LEAKY CAPACITIVE LOAD

(75) Inventor: Chia-Liang Lin, Fremont, CA (US)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 1270 days.

(21) Appl. No.: 12/967,108

(22) Filed: Dec. 14, 2010

(65) Prior Publication Data

US 2011/0140767 A1 Jun. 16, 2011

Related U.S. Application Data

(60) Provisional application No. 61/286,338, filed on Dec. 14, 2009.

(51) Int. Cl.
*G05F 1/10* (2006.01)
*H02M 3/07* (2006.01)
*H02M 1/00* (2006.01)

(52) U.S. Cl.
CPC ....... *H02M 3/07* (2013.01); *H02M 2001/0045* (2013.01)

(58) Field of Classification Search
CPC .......... H02M 3/07; H02M 3/073; G11C 5/145
See application file for complete search history.

(56) References Cited

U.S. PATENT DOCUMENTS

| 6,064,243 A | * | 5/2000 | Matsuda et al. | 327/156 |
| 7,668,279 B1 | * | 2/2010 | You et al. | 375/376 |
| 7,852,158 B2 | * | 12/2010 | Kobayashi et al. | 330/260 |

FOREIGN PATENT DOCUMENTS

| TW | 200737660 | | 10/2007 |
| TW | 200922086 | A | 5/2009 |
| TW | 200924363 | A | 6/2009 |

OTHER PUBLICATIONS

English Abstract translation of TW200922086 (Published May 16, 2009).
English Abstract translation of TW200924363 (Published Jun. 1, 2009).
English Abstract translation of TW200737660 (included in the foreign reference, Published Oct. 1, 2007).
TW Office Action dated Jul. 11, 2013.

\* cited by examiner

*Primary Examiner* — Sibin Chen
(74) *Attorney, Agent, or Firm* — McClure, Qualey & Rodack, LLP

(57) ABSTRACT

An apparatus comprises a charge pump to receive a phase signal representing a result of a phase detection and to output a current flowing between an internal node of the charge pump and an output node of the charge pump; a capacitive load coupled to the output node; a current source controlled by a bias voltage to output a compensation current to the output node; a current sensor coupled between the internal node and the output node to sense the current; and a feedback network to generate the bias voltage in accordance with an output of the current sensor. A comparable method is also disclosed.

20 Claims, 1 Drawing Sheet

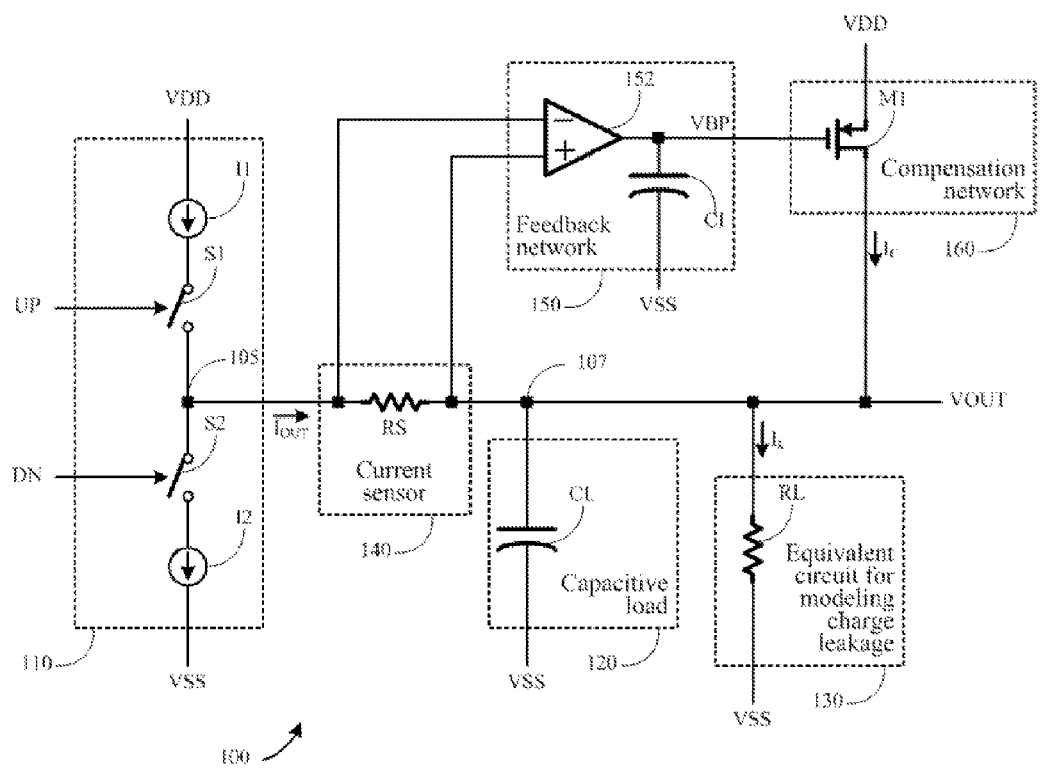

METHOD AND APPARATUS FOR CHARGE LEAKAGE COMPENSATION FOR CHARGE PUMP WITH LEAKY CAPACITIVE LOAD

CROSS-REFERENCE TO RELATED APPLICATION

This application claims priority to U.S. provisional patent application Ser. No. 61/286,338, filed Dec. 14, 2009, entitled "METHOD AND APPARATUS FOR CHARGE LEAKAGE COMPENSATION FOR CHARGE PUMP WITH LEAKY CAPACITIVE LOAD."

FIELD OF TECHNOLOGY

The present application generally relates to charge pumps and more particularly relates to compensation of charge leakage in charge pump circuitry for charge pumps having a leaky capacitive load.

BACKGROUND

A phase lock loop (PLL) is an important apparatus that is used in numerous applications. A PLL receives a reference clock and generates accordingly an output clock that is phase locked with the reference clock. A phase lock loop typically comprises a controller and a controlled oscillator. The controlled oscillator outputs an output clock with a frequency controlled by a control signal generated by the controller. The output clock is usually divided down by a factor of N, where N is an integer, resulting in a divided-down clock. The controller issues the control signal based on detecting a phase difference between a reference clock and the divided-down clock. The frequency of the output clock is thus controlled in a closed-loop manner so as to minimize a phase difference between the reference clock and the divided-down clock. In a steady state, the output clock is thus phase locked with the reference clock.

In a typical PLL, the controller comprises a phase detector and a filter. The phase detector receives the reference clock and the divided-down clock and outputs a detector output signal representing a phase difference between the reference clock and the divided-down clock. The filter receives and converts the detector output signal into the control signal to control the controlled oscillator. In a typical PLL, the phase detector comprises a PFD (phase/frequency detector) and a charge pump circuit, and the resultant detector output signal is a current-mode signal. The filter serves as a capacitive load for the charge pump circuit, and effectively filters and converts the current-mode detector output signal into a voltage-mode control signal to control the oscillator, which is a voltage-controlled oscillator (VCO). Modern phase lock loops are usually implemented in a CMOS (complementary metal-oxide semiconductor) integrated circuit. In a deep submicron CMOS integrated circuit, high-speed devices of short channel lengths are prone to charge leakage. In particular, the capacitive load is prone to charge leakage due to either using a leaky MOS transistor as capacitor or interfacing with leaky MOS transistors. The charge leakage at the capacitive load effectively introduces an error in the phase detection, which results in an error in the voltage-mode control signal and thus an error in the phase/frequency of the output clock. The error in the phase/frequency of the output clock is generally referred to as clock jitter.

Accordingly, what is desired is a method to reduce the clock jitter due to charge leakage of the capacitive load of the charge pump.

SUMMARY OF THIS INVENTION

An embodiment of the present invention is directed to an apparatus comprising: a charge pump to receive a phase signal representing a result of a phase detection and to output a current flowing between an internal node of the charge pump and an output node of the charge pump; a capacitive load coupled to the output node; a current source controlled by a bias voltage to output a compensation current to the output node; a current sensor coupled between the internal node and the output node to sense the current; and a feedback network to generate the bias voltage in accordance with an output of the current sensor.

Another embodiment of the invention is directed to a method for compensating charge leakage of a charge pump, the method comprising: receiving a phase signal representing a result of a phase detection; converting the phase signal into a current signal using the charge pump; transmitting the current signal into a capacitive load; detecting the current signal using a current sensor; injecting a compensation current into the capacitive load in accordance with a control voltage; and adapting the control voltage using a feedback network in accordance with an output of the current sensor.

DETAILED DESCRIPTION OF THE DRAWINGS

FIG. 1 shows a schematic diagram of a circuit in accordance with the present invention.

DETAILED DESCRIPTION

The following detailed description refers to the accompanying drawings which show, by way of illustration, various embodiments in which the invention may be practiced. These embodiments are described in sufficient detail to enable those skilled in the art to practice these and other embodiments. The various embodiments are not necessarily mutually exclusive, as some embodiments can be combined with one or more other embodiments to form new embodiments. The following detailed description is, therefore, not to be taken in a limiting sense.

FIG. 1 shows a schematic diagram of a circuit 100 in accordance with an embodiment of the invention. Circuit 100 comprises: a charge pump 110 for receiving a phase signal (comprising a first logical signal UP and a second logical signal DN) and outputting a current signal $I_{OUT}$ at an internal node 105; a capacitive load 120 comprising a capacitor CL for receiving the current signal $I_{OUT}$ and converting the current signal $I_{OUT}$ into an output voltage VOUT at an output node 107; a current sensor 140 embodied by a resistor RS inserted between the internal node 105 and the output node 107 for sensing the current signal $I_{OUT}$; a compensation network 160 embodied by a PMOS transistor M1 biased by a bias voltage VBP for injecting a compensation current $I_C$ into the output node 107; and a feedback network 150 embodied by an operational amplifier 152 loaded with an integrating capacitor CI for generating the bias voltage VBP. Here, VDD denotes a first substantially fixed-potential node (usually at an output of a power supply), and VSS denotes a second substantially fixed-potential node (usually referred to as "ground").

For illustration purpose, FIG. 1 further includes an equivalent circuit 130 (e.g., a fictitious shunt) comprising a load resistor RL at the output node 107 serving as an illustrative equivalent circuit to model the phenomenon of the charge leakage of the capacitive load 120. Note that in a real circuit embodiment, it is futile (and even detrimental)

to purposely insert a real shunt circuit like equivalent circuit 130 at the output node 107. Certain principles of this invention are explained below.

In a typical application to a phase lock loop, circuit 100 receives the phase signal (comprising the two logical signals UP and DN) as a timing detection result from a preceding phase detector (not shown in the FIGURE), and outputs the output voltage VOUT for controlling a succeeding voltage controlled oscillator (not shown in the FIGURE). A timing of an output clock of the voltage controlled oscillator is detected by comparing it with a reference timing (usually provided by a crystal oscillator) by the preceding phase detector. When a frequency of an output clock of the voltage controlled oscillator is too high, a timing of the output clock is often too early; this causes the second logical signal DN to be asserted more frequently, resulting in a decrease in the output voltage VOUT to decrease the frequency of the output clock. When the frequency of the output clock of the voltage controlled oscillator is too low, the timing of the output clock is often too late; this causes the first logical signal UP to be asserted more frequently, resulting in an increase in the output voltage VOUT to increase the frequency of the output clock. In this closed-loop manner, the output voltage VOUT is adjusted and settled into a value such that the frequency of the output clock is neither too high nor too low but just right. In the steady state, the output voltage VOUT must be settled, and therefore the following condition must be met:

$$\langle I_{OUT}+I_C-I_L\rangle=0 \quad (1)$$

Here, $\langle\ \rangle$ denotes a statistical mean. Equation (1) provides that the mean net current following into the output node 107 must be zero, otherwise the output voltage VOUT cannot be settled. If the mean value of $I_{OUT}$ is positive, the current sensor 140 senses a positive current more frequently, causing the feedback network 150 to gradually lower the bias voltage VBP, leading to an increase to the compensation current $I_C$ and accordingly the output voltage VOUT; this leads to an increase to the frequency of the output clock and accordingly an earlier timing that results in the second logical signal DN being asserted more frequently and thus a reduction of the mean value of $I_{OUT}$. If the mean value of $I_{OUT}$ is negative, the current sensor 140 senses a negative current more frequently, causing the feedback network 150 to gradually elevate the bias voltage VBP, leading to a gradual decrease to the compensation current $I_C$ and accordingly the output voltage VOUT; this leads to a decrease to the frequency of the output clock and accordingly a later timing that results in the first logical signal UP being asserted more frequently and thus an increase of the mean value of $I_{OUT}$ (but a decrease in an absolute value of the mean value of $I_{OUT}$ since it is negative). In either case, the phase lock loop reacts so as to reduce the absolute value of the mean value of $I_{OUT}$. In the steady state, the mean value of $I_{OUT}$ must be zero, otherwise the bias voltage VBP will either keep increasing or keep decreasing. By applying $\langle I_{OUT}\rangle=0$ to equation (1), one has $$I_C-I_L=0 \quad (2)$$

That is, the leakage current $I_L$ is exactly compensated by the compensation current $I_C$. In this manner, the detrimental effect of the leakage current is effectively alleviated.

However, in practical design one must choose a sufficiently large capacitance value for the integrating capacitor CI, so that the bias voltage VBP is adjusted much slower than the phase lock loop adjusts the output voltage VOUT (otherwise the phase lock loop may encounter instability).

Charge pump 110 comprises a current source I1, a current sink I2, a first switch S1, and a second switch S2. When the first logical signal UP is asserted, the current source I1 injects current into the internal node 105. When the second logical signal DN is asserted, the current sink I2 drains current from the internal node 105.

In an alternative embodiment (not shown in FIG. 1), the capacitive load 120 comprises a serial connection of a resistor and a capacitor.

In embodiment 100, it is assumed that the capacitive load 120, as a stand-alone circuit, is leaking toward VSS, and therefore the equivalent circuit 130 comprises a resistor shunt between the output of the capacitive load and VSS and consequently the compensation network 160 must inject current into the output of the capacitive load to compensate for the charge leakage. Depending on the actual embodiment of the capacitive load 120, however, it is possible that the capacitive load 120, as a stand-alone circuit, is leaking toward VDD. In this case, the equivalent circuit 130 must be a resistor shunt between the output of the capacitive load 120 and VDD and consequently the compensation network 160 must drain current from the output of the capacitive load 120; this can be fulfilled by changing the PMOS transistor M1 into a NMOS transistor. Those of ordinary skills in the art would appreciate other implementation details not particularly described herein.

Although specific embodiments have been illustrated and described herein, it will be appreciated by those of ordinary skill in the art that any arrangement that is calculated to achieve the same purpose may be substituted for the specific embodiments shown. This application is intended to cover adaptations and variations of the embodiments discussed herein. Various embodiments use permutations and/or combinations of embodiments described herein. It is to be understood that the above description is intended to be illustrative, and not restrictive, and that the phraseology or terminology employed herein is for the purpose of description.

What is claimed is:

1. An apparatus comprising:
   a charge pump to receive a phase signal representing a result of a phase detection and to output a current flowing between an internal node of the charge pump and an output node of the charge pump;
   a capacitive load coupled to the output node;
   a current source controlled by a bias voltage to output a compensation current to the output node;
   a current sensor coupled between the internal node and the output node to sense the current; and
   a feedback network to generate the bias voltage in accordance with an output of the current sensor.

2. The apparatus of claim 1, wherein the phase signal comprises a first logical signal and a second logical signal.

3. The apparatus of claim 2, wherein the charge pump comprises a current source and a current sink.

4. The apparatus of claim 3, wherein the charge pump further comprises: a first switch controlled by the first logical signal and coupled between the current source and the internal node, and a second switch controlled by the second logical signal and coupled between the current sink and the internal node.

5. The apparatus of claim 1, wherein the current sensor comprises a resistor.

6. The apparatus of claim 5, wherein the output of the current sensor is a voltage difference between a first terminal and a second terminal of the resistor.

7. The apparatus of claim 1, wherein the feedback network comprises an amplifier for receiving the output of the current sensor and amplifying the output of the current sensor for generating the bias voltage.

8. The apparatus of claim 7, wherein the amplifier is terminated with an integrating capacitor for holding the bias voltage.

9. The apparatus of claim 1, wherein a voltage at the output node is used for controlling a timing of a timing device.

10. The apparatus of claim 9, wherein the phase signal represents a detection of the timing of the timing device.

11. A method for compensating charge leakage of a charge pump, the method comprising:
    receiving a phase signal representing a result of a phase detection;
    converting the phase signal into a current signal using the charge pump;
    transmitting the current signal into a capacitive load;
    detecting the current signal using a current sensor;
    injecting a compensation current into the capacitive load in accordance with a control voltage; and
    adapting the control voltage using a feedback network in accordance with an output of the current sensor.

12. The method of claim 11, wherein the phase signal comprises a first logical signal and a second logical signal.

13. The method of claim 12, wherein the charge pump comprises a current source and a current sink.

14. The method of claim 13, wherein the charge pump further comprises: a first switch controlled by the first logical signal and coupled between the current source and the internal node, and a second switch controlled by the second logical signal and coupled between the current sink and the internal node.

15. The method of claim 11, wherein the current sensor comprises a resistor.

16. The method of claim 15, wherein the output of the current sensor is a voltage difference between a first terminal and a second terminal of the resistor.

17. The method of claim 11, wherein the feedback network comprises an amplifier for receiving the output of the current sensor and amplifying the output of the current sensor for generating the control voltage.

18. The method of claim 17, wherein the amplifier is terminated with an integrating capacitor for holding the control voltage.

19. The method of claim 11, wherein a voltage associated with the capacitive load is used for controlling a timing of a timing device.

20. The method of claim 19, wherein the phase signal represents a detection of the timing of the timing device.

* * * * *